(12) United States Patent
Goyal et al.

(10) Patent No.: US 10,540,187 B2
(45) Date of Patent: Jan. 21, 2020

(54) USER-INITIATED DYNAMIC DATA APPLICATION PROGRAMMING INTERFACE CREATION

(71) Applicant: International Business Machines Corporation, Armonk, NY (US)

(72) Inventors: Praduemn Goyal, Iselin, NJ (US); Rajasekar Krishnamurthy, San Jose, CA (US); Diptikalyan Saha, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/783,209

(22) Filed: Oct. 13, 2017

(65) Prior Publication Data

US 2019/0114181 A1    Apr. 18, 2019

(51) Int. Cl.
| | |
|---|---|
| *G06F 17/30* | (2006.01) |
| *G06F 9/445* | (2018.01) |
| *G06F 16/242* | (2019.01) |
| *G06F 16/245* | (2019.01) |
| *G06F 16/2452* | (2019.01) |

(52) U.S. Cl.
CPC ........ *G06F 9/44505* (2013.01); *G06F 16/242* (2019.01); *G06F 16/245* (2019.01); *G06F 16/2452* (2019.01)

(58) Field of Classification Search
CPC ...................................................... G06F 3/018

USPC ............................................... 707/756; 704/2
See application file for complete search history.

(56) References Cited

U.S. PATENT DOCUMENTS

| | | | |
|---|---|---|---|
| 6,253,257 B1 | 6/2001 | Dundon | |
| 8,677,308 B2 | 3/2014 | Hopkins | |
| 9,367,623 B2 | 6/2016 | Khosravy et al. | |
| 2006/0224564 A1* | 10/2006 | Yu | G06F 16/22 |
| | | | 707/999.002 |
| 2012/0041752 A1* | 2/2012 | Wang | G06F 3/018 |
| | | | 704/2 |
| 2013/0132584 A1 | 5/2013 | Palladino et al. | |
| 2014/0366000 A1* | 12/2014 | Batabyal | G06F 8/61 |
| | | | 717/120 |

OTHER PUBLICATIONS

Oracle, Database Java Developer's Guide, https://docs.oracle.com/cd/B28359_01/java.111/b31225/chtwelve.htm, accessed Oct. 13, 2017.

(Continued)

*Primary Examiner* — Baoquoc N To
(74) *Attorney, Agent, or Firm* — Ryan, Mason & Lewis, LLP

(57) ABSTRACT

Methods, systems, and computer program products for user-initiated dynamic data application programming interface creation are provided herein. A computer-implemented method includes automatically transforming a user-provided query into one or more parameterized queries, generating a data application programming interface based on at least one of the parameterized queries, outputting the generated data application programming interface to the user providing the user-provided query, and storing the generated data application programming interface in a database accessible to one or more additional users.

16 Claims, 6 Drawing Sheets

(56) References Cited

OTHER PUBLICATIONS

Import.io, Simple API integration: using the import.io REST API, https://importio.uservoice.com/knowledgebase/articles/465458-simple-api-integration-using-the-import-io-rest-a, accessed Oct. 13, 2017.

Diffbot, Custom APIs, https://www.diffbot.com/dev/docs/custom/, accessed on Oct. 13, 2017.

Apigee, Understanding APIs and API proxies, http://docs.apigee.com/api-services/content/understanding-apis-and-api-proxies, accessed on Oct. 13, 2017.

* cited by examiner

USER-INITIATED DYNAMIC DATA APPLICATION PROGRAMMING INTERFACE CREATION

FIELD

The present application generally relates to information technology, and, more particularly, to application programming interface (API) creation techniques.

BACKGROUND

Attempting to present data APIs to users presently raises numerous challenges. In existing approaches, for example, API providers can present a list of one or more APIs for users (API developers, for instance) to use in an intended application. Commonly, there are two presentation approaches based on the types of APIs presented. In the first approach (also referred to herein as [A1]), a set of APIs is provided by a provider, and users use one or more of the APIs by providing any required input data (for example, input data necessary to obtain results via the API(s)). Different APIs correspond to obtaining and/or generating different types of data, and the type of data that can be accessed is described for each API. However, with this ([A1]) approach, the user does not know the entirety of the data that are available or what information can be accessed for each API. Accordingly, if the API does not suit the user's purpose, the user cannot change the API.

In the second approach (also referred to herein as [A2]), a single low-level API/end-point is provided by the provider, wherein the single low-level API/end-point accepts many complex queries along with input data in a query language. However, with this ([A2]) approach, the user likely needs to be highly-skilled in query languages, and the user has to create his or her own query.

SUMMARY

In one embodiment of the present invention, techniques for user-initiated dynamic data application programming interface creation are provided. An exemplary computer-implemented method can include steps of automatically transforming a user-provided query into one or more parameterized queries, generating a data application programming interface based on at least one of the parameterized queries, outputting the generated data application programming interface to the user providing the user-provided query, and storing the generated data application programming interface in a database accessible to one or more additional users.

In another embodiment of the invention, an exemplary computer-implemented method can include generating a first prompt for input from a user, wherein the input in response to the first prompt comprises a concrete query, and automatically transforming the user-input concrete query into multiple parameterized queries. The method can also include generating multiple data application programming interfaces based on the multiple parameterized queries, and presenting the generated data application programming interfaces to the user. Further, the method can additionally include generating a second prompt for input from the user, wherein the input in response to the second prompt comprises a user selection of one of the presented data application programming interfaces, and invoking the user-selected data application programming interfaces based on the input in response to the second prompt.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
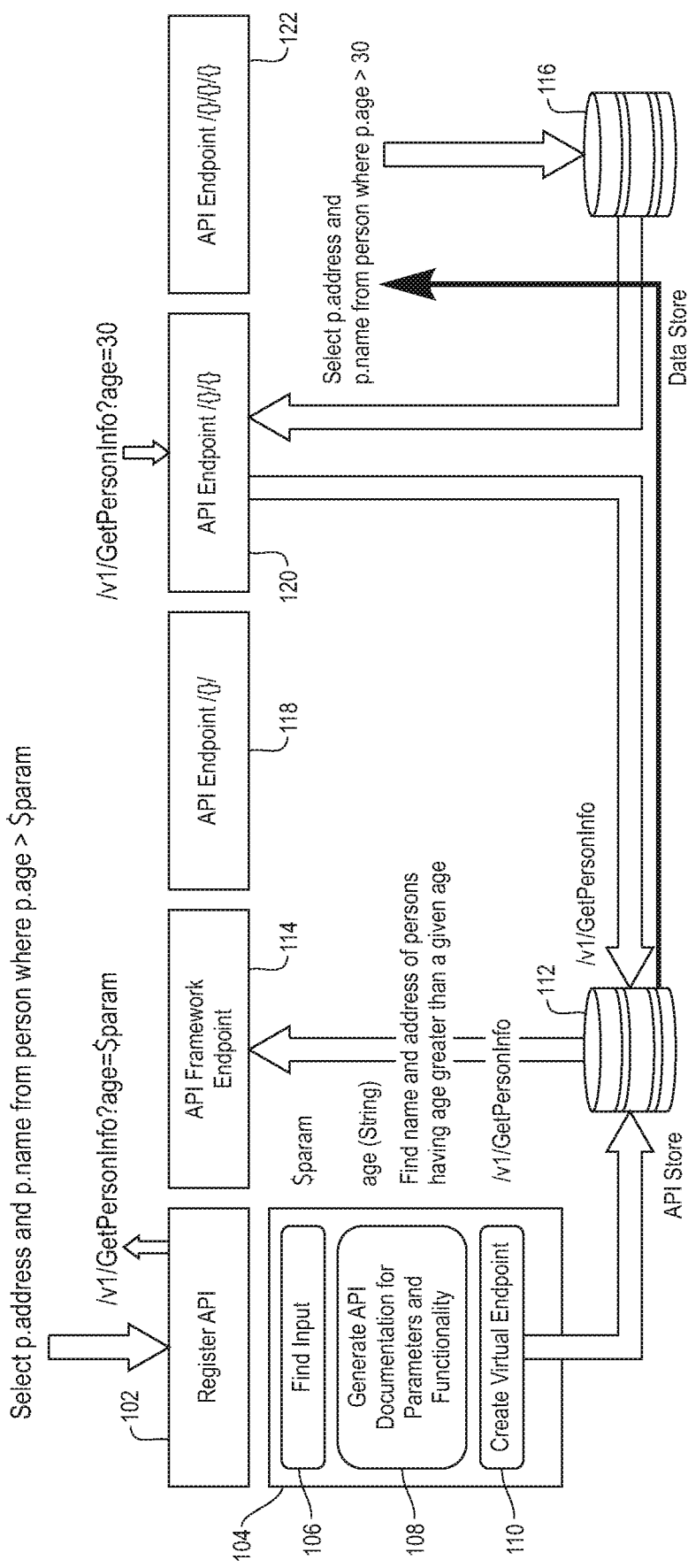
FIG. 1 is a diagram illustrating system architecture, according to an exemplary embodiment of the invention.

As described herein, an embodiment of the present invention includes user-initiated dynamic data application programming interface creation. At least one embodiment of the invention includes automatically transforming query-related information submitted by users into APIs by mapping data from a raw database API to a representational state transfer (REST) API. As used herein, "query-related information" can include a parameterized query (instead of a concrete query), wherein concrete values associated with the query are not included (or provided by the user). By way merely of example, such query-related information can include "Select p.ssn, p.name from a person where p.age>$param." With respect to the above query, "p" stands for "parameter" and "ssn" stands for social security number. Additionally, the above-noted mapping of data from a raw database API to a REST API can include, by way of example, mapping between "/v1/GetPersonInfo?age=$param" and "Select p.ssn, p.name from person where p.age>$param."

In one or more such embodiments, the user does not need to provide a concrete query (such as a query with values, for example), but can merely specify input and output search parameters. The specifics of such parameters (such as the values of such parameters) can be extracted from the transformation done on the query-related information to form the REST API pattern. Accordingly, one or more embodiments of the invention can include automatically generating a (concrete) query based on the input and output parameters submitted by the user.

Additionally, at least one embodiment of the invention includes registering the REST APIs and the documentation related thereto without modifying the code. Such a step can be carried out using a concept referred to herein as virtual end-point. By way of example and further illustration, it is noted that an API generally includes (1) a path, (2) one or more path parameters, and (3) one or more query parameters. For example, the API "/v1/GetPersonInfo?age=$param" has a path of "/v1/GetPersonInfo" and a query parameter of "age." Consider another example API of "/v1/persons/{$gender}?age=$ageParam," which has a path of "/v1/persons/," path parameters of "gender," and a query parameter of "age."

With respect to a physical end-point, consider the following example illustrated via a code snippet. A developer can write a function and annotate the function with a path, path parameters and query parameters to expose that function as an API. When that code compiles, it generates a physical end-point (also referred to as a static end-point). For example, to implement the same API at /v1/GetPersonInfo?age=$param, a developer has to write a function and specify a path and query parameters for that function. The function should hard-code the query "Select p.ssn, p.name from person where p.age>," add whatever value that user has supplied to this part of the query, create the database query, and execute the query against the database.

A virtual end-point (also referred to herein as a dynamic end-point) is generated at run-time. In such a context, the developer cannot write a code for a query that the developer does not know beforehand. However, that query and/or parameterized query will be supplied by a user or will be known at run-time. Accordingly, in creating the virtual end-point, multiple physical/static end-points are created at compile time with one or more path parameters, such as the following examples: (i) /v1/{Param1}; (ii) /v1/{Param1}/{Param2}; and (iii) /v1/{Param1}/{Param2}/{param3}. An example virtual end-point, /v1/GetPersonInfo, is an instance of the static end-point /v1/{Param1}.

Corresponding documentation can be generated in such a way as to indicate to the user that there is an API that is created with path /v1/GetPersonInfo. However, no such API is actually created; it is simply that /v1/GetPersonInfo?age=30 is invoked and gets mapped to a physical end-point.

By way of additional example, consider /v1/{param1, wherein "param1" is a path parameter which will take the value "GetPersonInfo." Also, the code for "/v1/{param1}" can be written as a query (getsQueryMap(param1)), as well as a concrete query (ApplyQueryParameters (Query, QueryParameters). In connection with such a concrete query, a return can include execute(ConcrteQuery)), which will work for any virtual end-point query.

Registering the APIs in one or more embodiments of the invention can include creating and/or defining the APIs (with API paths and query parameters) for the first time in the API server. Additionally, in one or more embodiments of the invention, registering the APIs can include creating the APIs and the documentation related thereto dynamically at runtime. The documentation can be created based on knowledge of the semantics (via the query) behind the API. Also, the registration process can include generating an API pattern (pertaining to path and query parameters) and associating the generated pattern with an underlying query in a template store. By way of example, such documentation can include a description of the input, a description of the output model, and a description of the functionality of the API.

Further, at least one embodiment of the invention can also include listing and/or presenting the dynamically created APIs to one or more users, wherein each user can use his or her own initiated APIs as provider-initiated-APIs by merely providing the input data required.

Referring to the two approaches detailed above, one or more embodiments of the invention can include an [A2]-type user inputting a query (and optionally related API documentation). Such an embodiment can then include creating and/or outputting an API for the query with user-chosen parameterization. Accordingly, the user can invoke the provided API by supplying values to parameters instead of using the initially input query. Additionally, other users (who did not create the API) can use the API as well.

In accordance with such an example embodiment of the invention, [A2]-type users can use a single low-level end-point (for example, a query language for accessing data) to submit one or more queries to the system and access data. One or more embodiments of the invention then includes automatically transforming these queries into APIs and registering these APIs and their documentation. These dynamically generated APIs can subsequently be used, for example, by [A1]-type users by those users providing only one or more items of input data (such as, for example, an age value in the above example). Additionally, [A2]-type users (such as the [A2] user who initiated the APIs in question) can also reuse these dynamic APIs without submitting the original queries. Moreover, any user can subsequently view and use all such user-initiated dynamically created APIs.

As detailed herein, at least one embodiment of the invention includes using a data-store query (for example, a specification for desired API functionality) to create a REST API end-point for the query. Such an embodiment can require, for example, merely one or more parameters to the query input (by a user) at run-time. Additionally, such an embodiment is not data-store specific (that is, not confined to relational databases). Further, one or more embodiments of the invention can include utilizing a language such as, for example, an ontology query language (OQL), which is ontology based and which provides physical and logical independence. Also, such an embodiment can additionally include implementing one or more translators from OQL to structured query language (SQL), SPARQL, etc.

Between an API and a data-store specific query, an example embodiment of the invention can include implementing two processing layers: one layer which processes input parameter values and generates a concrete query from a parameterized query; and another layer which obtains results from the data-store and checks the results to generate appropriate hypertext transfer protocol (HTTP) code.

FIG. 1 is a diagram illustrating system architecture, according to an embodiment of the invention. By way of illustration, FIG. 1 depicts an example embodiment of the invention in connection with the task of determining the name and address of persons having an age greater than a given age. As illustrated in FIG. 1, that task (select p.address and p.name from person where p.age>$param) is sent to component 102, which registers an API related to the task (as further described herein). Component 104 then determines and/or identifies input 106 for the registered API. Additionally, component 104 generates API documentation 108 for parameters and functionality of the registered API. Further, component 104 creates a virtual end-point 110 in connection with the registered API.

By way of example, consider the following parameterized query: "Select p.ssn, p.name from person where p.age>$param." Based on this parameterized query, one or more embodiments of the invention can include generating an input description (as it is known that the parameter should be a valid age, its data type is int.), an output description (from the "Select" clause, it can be described that each row of the output will contain a social security number (SSN) and the name of the person), and a description of the API functionality (from the semantics of the query, a natural language description can be generated that the query will return the SSN and the name of all persons whose age is more than the user provided age).

The created virtual end-point 110 is then provided to an API data-store 112. Additionally, API end-points 118, 120 and 122 also provide input to API data-store 112, wherein such input can be based, for example, on information stored in a separate data-store 116. Additionally, based on the above-noted interactions, the API data-store 112 can provide information to an API framework end-point 114.

Figure 2:
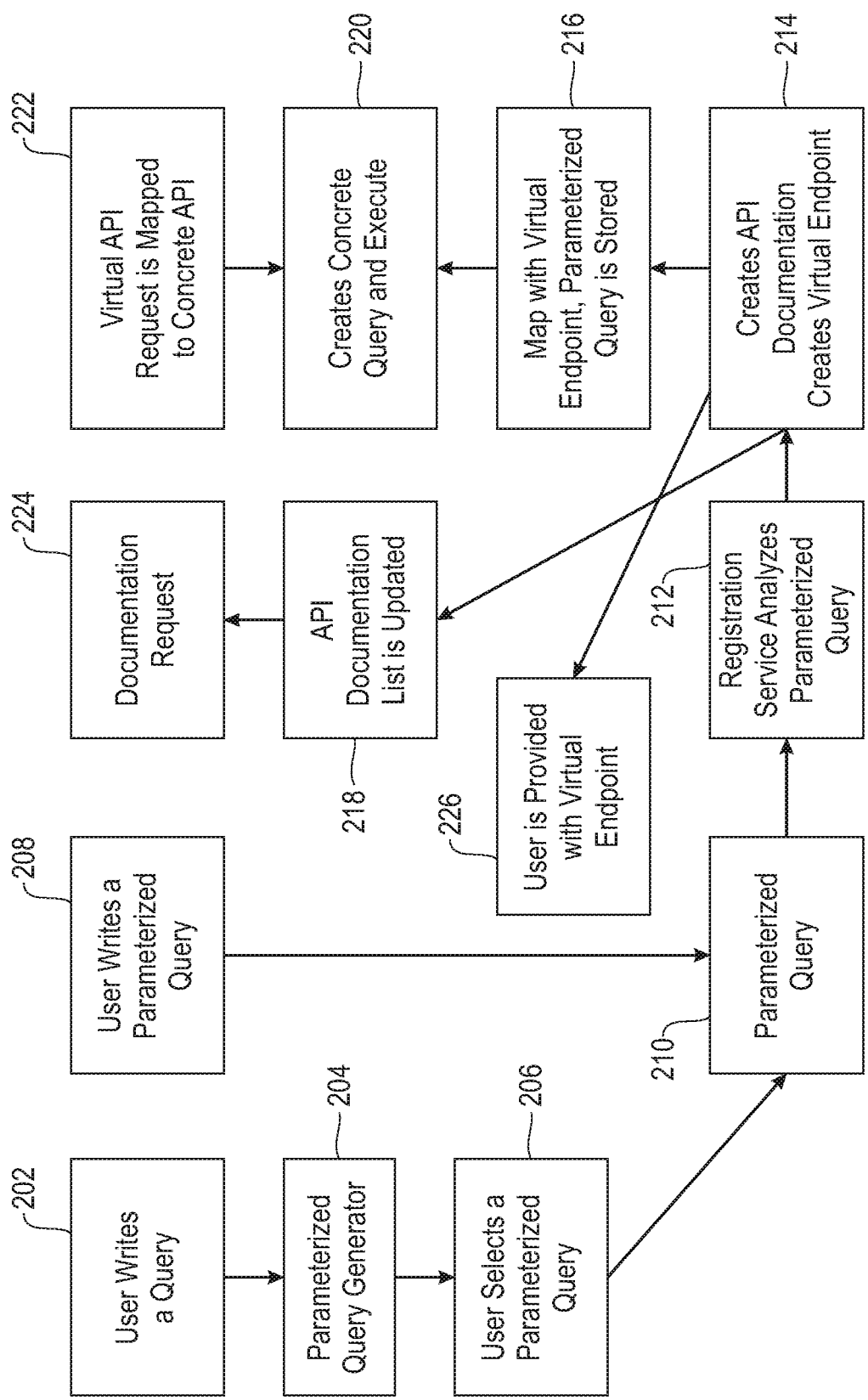
FIG. 2 is a flow diagram illustrating techniques according to an embodiment of the present invention.

FIG. 2 is a flow diagram illustrating techniques according to an embodiment of the present invention. In step 202, a user writes a query, which is provided to a parameterized query generator 204. The parameterized query generator 204 takes a concrete query 202 as input and generates one/more parameterized queries. This involves a two-step process: the parameterized query generator 204 identifies the query parameters, and subsequently, using those parameters, the parameterized query generator 204 generates one/more parameterized queries. In the first step, the parameterized query generator 204 parses the concrete query 202 with a parser. For example, if the target database is a relational database, then the parameterized query generator 204 knows that the concrete queries will be in SQL and therefore it can use an SQL parser. When a query is parsed, the part of the query that maps can be deemed a parameter. For this, one or more embodiments of the invention can include using an annotated grammar. For example, such an annotated grammar will say that in a where clause rule of SQL grammar, object DOT property BINOP VALUE, the VALUE is a query parameter.

By way of example, consider again: Select p.ssn, p.name from person where p.age>30. In this example, 30 will be identified as a query parameter. Once the query parameters are identified, parameterized queries can be generated wherein each parameterized query has a subset of the query parameters chosen as API parameters. Accordingly, if there is only one query parameter, then that parameter will be chosen as the API parameter.

By way of an additional example, given a concrete query, at least one embodiment of the invention can include generating multiple parameterized queries. For instance, for the concrete query "Select p.ssn, p.name from person where p.gender='male' and p.age>30," both "male" and "30" will be identified as query parameters. Then, based on which subset of these query parameters is utilized, multiple parameterized queries can be generated as follows:
1. Select p.ssn, p.name from person wherein p.gender=@param1 and p.age>@param2;
2. Select p.ssn, p.name from person wherein p.gender='male' and p.age>@param1; and
3. Select p.ssn, p.name from person wherein p.gender=@param1 and p.age>30.

The parameterized query generator 204 generates multiple parameterized queries, and in step 206, the user selects one of the generated parameterized queries. The selected parameterized query 210 (or, in one or more embodiments of the invention, the user can write the parameterized query, such as depicted in step 208) is analyzed by a registration service in step 212. Based on this analysis, step 214 includes creating API documentation as well as creating a virtual end-point.

In step 218, an API documentation list is updated using the created API documentation from step 214. Such updated API documentation can then be used to respond to a documentation request, such as depicted in step 224. Also, in step 226, the user is provided with the created virtual end-point (which the user can invoke by providing appropriate input), and in step 216, the parameterized query is mapped with the virtual end-point and stored. Based on this mapping, step 220 includes creating a concrete query. As used herein, a concrete value refers to a value from a domain string integer. Also, a concrete query refers to a query which does not have any parameters. A concrete query can be executed against a database, whereas a parameterized query cannot be executed, as it has to be turned into a concrete query by providing value(s) for the parameter(s). Referring back to FIG. 2, the concrete query can be executed, and in step 222, a virtual API request can be mapped to the concrete API.

Figure 3:
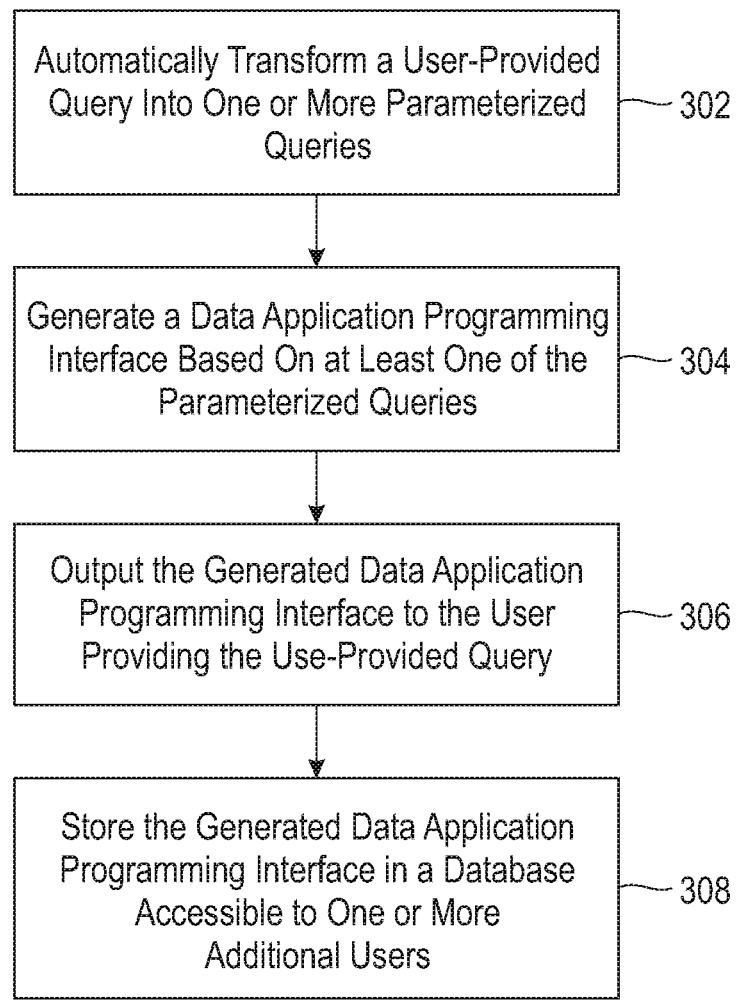
FIG. 3 is a flow diagram illustrating techniques according to an embodiment of the invention.

FIG. 3 is a flow diagram illustrating techniques according to an embodiment of the present invention. Step 302 includes automatically transforming a user-provided query into one or more parameterized queries. Step 304 includes generating a data application programming interface based on at least one of the parameterized queries. Generating the data application programming interface can include mapping data from a raw database application programming interface to a representational state transfer application programming interface.

Step 306 includes outputting the generated data application programming interface to the user providing the user-provided query. Also, step 308 includes storing the generated data application programming interface in a database accessible to one or more additional users. Storing the generated data application programming interface in the database can include storing information indicating that the generated data application programming interface is related to the one or more parameterized queries.

Additionally, the techniques depicted in FIG. 3 can include calling the stored data application programming interface from the database upon processing a user-provided concrete value for a parameter of the corresponding parameterized query. Further, one or more embodiments of the invention can include mapping the user-provided concrete value to the parameterized query corresponding to the stored data application programming interface, and executing the parameterized query based on said mapping.

The techniques depicted in FIG. 3 can also include generating, based on at least one of the parameterized queries, a virtual end-point that corresponds to the generated data application programming interface, as well as outputting the virtual end-point to the user providing the user-provided query.

Also, an additional embodiment of the invention includes generating a first prompt for input from a user, wherein the input in response to the first prompt comprises a concrete query, and automatically transforming the user-input concrete query into multiple parameterized queries. Such an embodiment can also include generating multiple data application programming interfaces based on the multiple parameterized queries, and presenting the generated data application programming interfaces to the user. Further, such an embodiment can additionally include generating a second prompt for input from the user, wherein the input in response to the second prompt comprises a user selection of one of the presented data application programming interfaces, and invoking the user-selected data application programming interfaces based on the input in response to the second prompt.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives a user-generated query sent from a data source to the transmission server. The server can process the information, for example, based upon user-provided user preference information that is stored in memory on the server. Subsequently, an alert is generated containing a virtual end-point and/or a concrete query based on the user-generated query. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
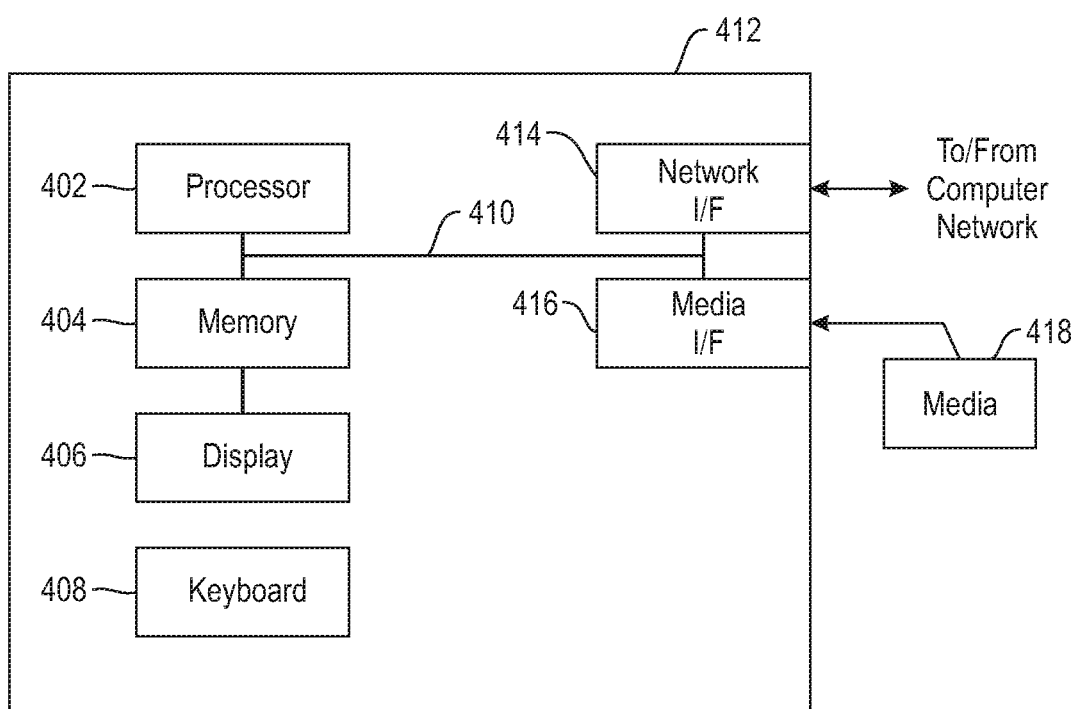
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
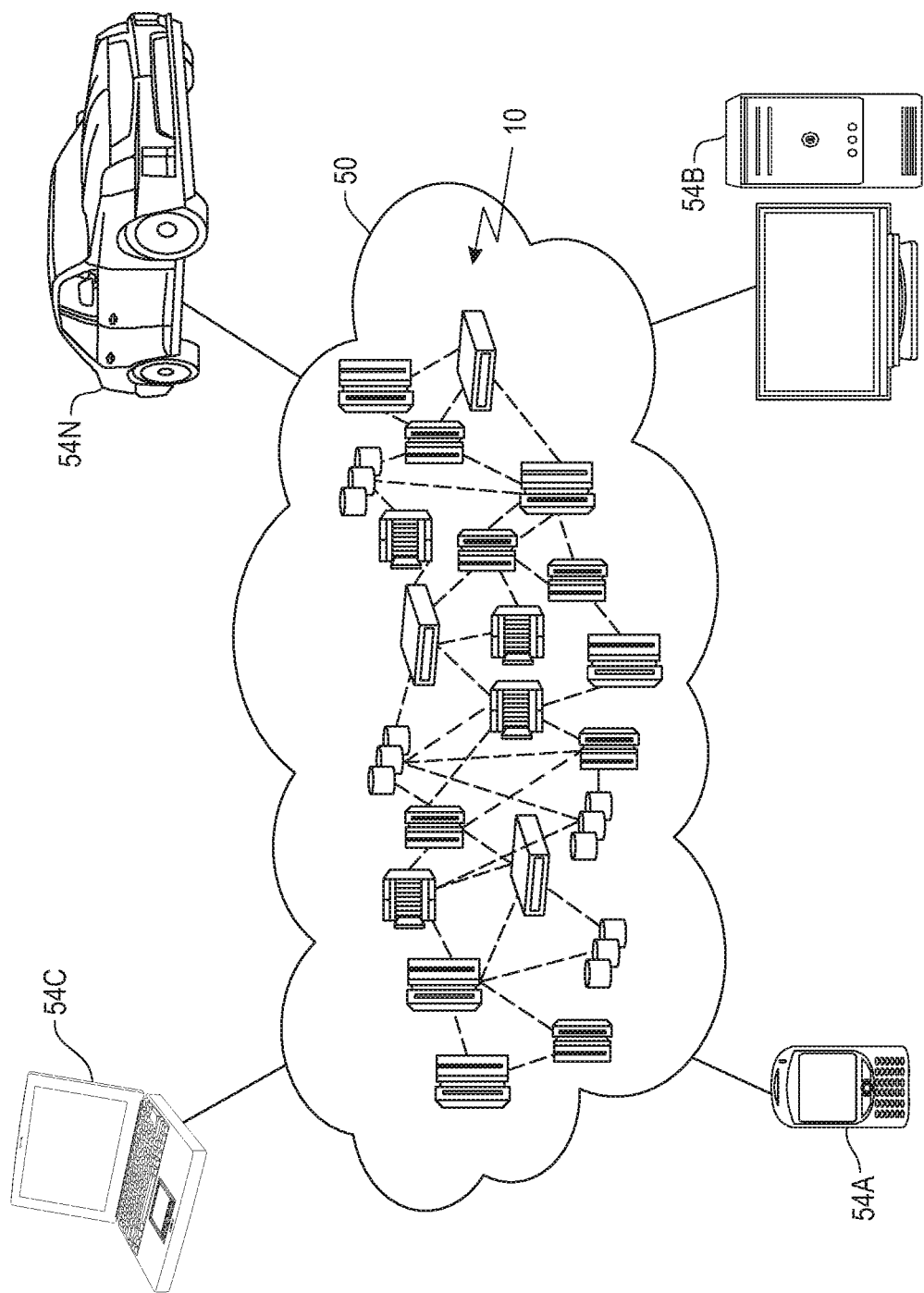
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
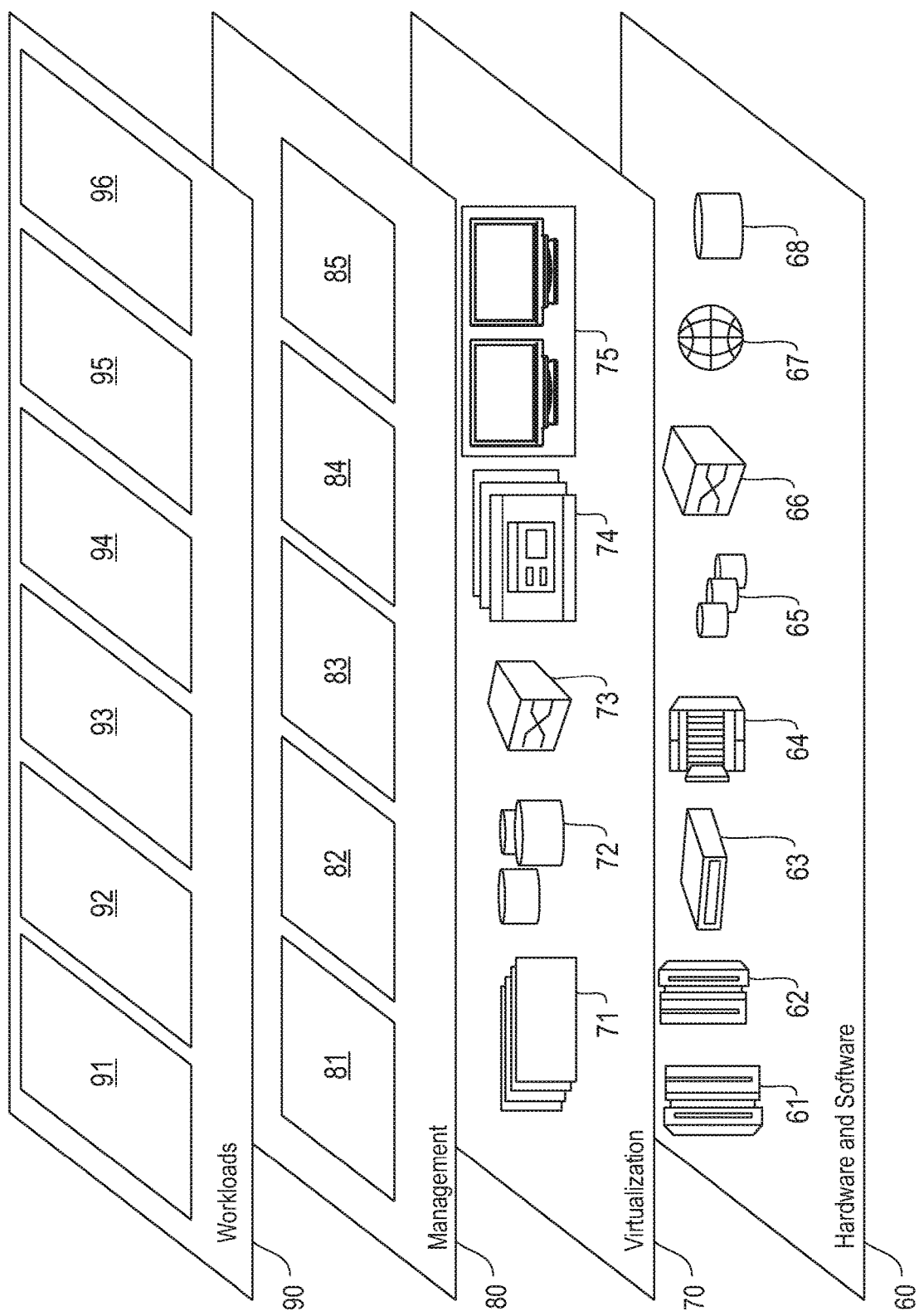
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user-initiated dynamic data API creation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, registering REST APIs and the documentation related thereto, without modifying the code, using a virtual end-point.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   automatically transforming a user-provided query into one or more parameterized queries;
   generating a data application programming interface based on at least one of the parameterized queries;
   outputting the generated data application programming interface to the user providing the user-provided query;
   storing the generated data application programming interface in a database accessible to one or more additional users;
   generating, based at least in part on at least one of the parameterized queries, a virtual end-point that corresponds to the generated data application programming interface, wherein said generating the virtual end point comprises creating multiple physical end-points at compile time with one or more path parameters; and
   outputting the virtual end-point to the user providing the user-provided query;
   wherein the method is carried out by at least one computing device.

2. The computer-implemented method of claim 1, wherein storing the generated data application programming interface in the database comprises storing information indicating that the generated data application programming interface is related to the one or more parameterized queries.

3. The computer-implemented method of claim 1, comprising:
   calling the stored data application programming interface from the database upon processing a user-provided concrete value for a parameter of the corresponding parameterized query.

4. The computer-implemented method of claim 3, comprising:
   mapping the user-provided concrete value to the parameterized query corresponding to the stored data application programming interface.

5. The computer-implemented method of claim 4, comprising:
   executing the parameterized query based on said mapping.

6. The computer-implemented method of claim 1, wherein generating the data application programming interface comprises mapping data from a raw database application programming interface to a representational state transfer application programming interface.

7. A computer program product comprising a computer readable storage medium having program instructions embodied therewith, the program instructions executable by a computing device to cause the computing device to:
   automatically transform a user-provided query into one or more parameterized queries;
   generate a data application programming interface based on at least one of the parameterized queries;

output the generated data application programming interface to the user providing the user-provided query;
store the generated data application programming interface in a database accessible to one or more additional users;
generate, based at least in part on at least one of the parameterized queries, a virtual end-point that corresponds to the generated data application programming interface, wherein said generating the virtual end point comprises creating multiple physical end-points at compile time with one or more path parameters; and
output the virtual end-point to the user providing the user-provided query.

8. The computer program product of claim 7, wherein storing the generated data application programming interface in the database comprises storing information indicating that the generated data application programming interface is related to the one or more parameterized queries.

9. The computer program product of claim 7, wherein the program instructions further cause the computing device to:
call the stored data application programming interface from the database upon processing a user-provided concrete value for a parameter of the corresponding parameterized query.

10. The computer program product of claim 7, wherein the program instructions further cause the computing device to:
map the user-provided concrete value to the parameterized query corresponding to the stored data application programming interface; and
execute the parameterized query based on said mapping.

11. The computer program product of claim 7, wherein generating the data application programming interface comprises mapping data from a raw database application programming interface to a representational state transfer application programming interface.

12. A system comprising:
a memory; and
at least one processor operably coupled to the memory and configured for:
automatically transforming a user-provided query into one or more parameterized queries;
generating a data application programming interface based on at least one of the parameterized queries;
outputting the generated data application programming interface to the user providing the user-provided query;
storing the generated data application programming interface in a database accessible to one or more additional users;
generating, based at least in part on at least one of the parameterized queries, a virtual end-point that corresponds to the generated data application programming interface, wherein said generating the virtual end point comprises creating multiple physical end-points at compile time with one or more path parameters; and
outputting the virtual end-point to the user providing the user-provided query.

13. A computer-implemented method comprising:
generating a first prompt for input from a user, wherein the input in response to the first prompt comprises a concrete query;
automatically transforming the user-input concrete query into multiple parameterized queries;
generating multiple data application programming interfaces based on the multiple parameterized queries;
generating, based at least in part on at least one of the multiple parameterized queries, one or more virtual end-points that correspond to the generated data application programming interfaces, wherein said generating the one or more virtual end points comprises creating multiple physical end-points at compile time with one or more path parameters; and
presenting the generated data application programming interfaces and the one or more virtual end-points to the user;
generating a second prompt for input from the user, wherein the input in response to the second prompt comprises a user selection of one of the presented data application programming interfaces and at least one of the one or more virtual end-points; and
invoking the user-selected data application programming interfaces based on the input in response to the second prompt;
wherein the method is carried out by at least one computing device.

14. The computer-implemented method of claim 13, comprising:
storing the generated data application programming interfaces in a database accessible to one or more additional users.

15. The computer-implemented method of claim 14, comprising:
calling a stored data application programming interface from the database upon processing a user-provided concrete value for a parameter of at least one of the corresponding parameterized queries;
mapping the user-provided concrete value to the at least one parameterized query corresponding to the stored data application programming interface; and
executing the at least one parameterized query based on said mapping.

16. The computer-implemented method of claim 13, wherein generating the data application programming interfaces comprises mapping data from raw database application programming interfaces to representational state transfer application programming interfaces.

* * * * *